(12) United States Patent
Chu et al.

(10) Patent No.: US 11,127,181 B2
(45) Date of Patent: Sep. 21, 2021

(54) AVATAR FACIAL EXPRESSION GENERATING SYSTEM AND METHOD OF AVATAR FACIAL EXPRESSION GENERATION

(71) Applicant: XRSPACE CO., LTD., Taoyuan (TW)

(72) Inventors: Feng-Seng Chu, New Taipei (TW); Peter Chou, Taipei (TW)

(73) Assignee: XRSPACE CO., LTD., Taoyuan (TW)

( * ) Notice: Subject to any disclaimer, the term of this patent is extended or adjusted under 35 U.S.C. 154(b) by 0 days.

(21) Appl. No.: 16/802,571

(22) Filed: Feb. 27, 2020

(65) Prior Publication Data

US 2020/0193667 A1 Jun. 18, 2020

Related U.S. Application Data

(63) Continuation-in-part of application No. 16/655,250, filed on Oct. 17, 2019, now Pat. No. 11,087,520.
(Continued)

(51) Int. Cl.
*G06T 11/60* (2006.01)
*G06K 9/00* (2006.01)
(Continued)

(52) U.S. Cl.
CPC .......... *G06T 11/60* (2013.01); *G06K 9/00302* (2013.01); *G06K 9/6269* (2013.01);
(Continued)

(58) Field of Classification Search
CPC combination set(s) only.
See application file for complete search history.

(56) References Cited

U.S. PATENT DOCUMENTS 9,519,640 B2 12/2016 Perez et al.
2005/0190188 A1 9/2005 Anzawa et al.
(Continued)

FOREIGN PATENT DOCUMENTS

CN 108877336 11/2018
JP 2962549 10/1999
(Continued)

OTHER PUBLICATIONS

"Office Action of Taiwan Related Application, application No. 108144988", dated Sep. 22, 2020, p. 1-p. 7.
(Continued)

*Primary Examiner* — Andrew G Yang
(74) *Attorney, Agent, or Firm* — JCIP Global Inc.

(57) ABSTRACT

An avatar facial expression generating system and a method of avatar facial expression generation are provided. In the method, multiple user data are obtained and related to the sensing result of a user from multiple data sources. Multiple first emotion decisions are determined, respectively, based on each user data. Whether an emotion collision occurs among the first emotion decisions is determined. The emotion collision is related that the corresponding emotion groups of the first emotion decisions are not matched with each other. A second emotion decision is determined from one or more emotion groups according to the determining result of the emotion collision. The first or second emotion decision is related to one emotion group. A facial expression of an avatar is generated based on the second emotion decision. Accordingly, a proper facial expression of the avatar could be presented.

18 Claims, 8 Drawing Sheets

Related U.S. Application Data which is a continuation-in-part of application No. 16/136,241, filed on Sep. 19, 2018, now abandoned.

(51) Int. Cl.
| | | |
|---|---|---|
| *G06K 9/62* | (2006.01) | |
| *G06N 20/00* | (2019.01) | |
| *G10L 25/63* | (2013.01) | |
| *G06F 3/01* | (2006.01) | |
| *G10L 15/22* | (2006.01) | |
| *G10L 15/18* | (2013.01) | |
| *G10L 15/08* | (2006.01) | |

(52) U.S. Cl.
CPC ........... *G06K 9/6286* (2013.01); *G06N 20/00* (2019.01); *G06F 3/011* (2013.01); *G10L 15/1815* (2013.01); *G10L 15/22* (2013.01); *G10L 25/63* (2013.01); *G10L 2015/088* (2013.01)

(56) References Cited

U.S. PATENT DOCUMENTS

| | | | |
|---|---|---|---|
| 2011/0141258 A1 | 6/2011 | Song et al. | |
| 2011/0296324 A1 | 12/2011 | Goossens et al. | |
| 2012/0139830 A1 | 6/2012 | Hwang et al. | |
| 2012/0223952 A1 | 9/2012 | Kanemaru et al. | |
| 2014/0307926 A1* | 10/2014 | Murakami | G06T 7/20 382/107 |
| 2016/0307028 A1 | 10/2016 | Fedorov | |
| 2017/0206694 A1* | 7/2017 | Jiao | G06T 7/246 |
| 2018/0025506 A1 | 1/2018 | Li et al. | |
| 2018/0047391 A1* | 2/2018 | Baik | G10L 25/57 |
| 2018/0077095 A1* | 3/2018 | Deyle | G10L 25/63 |
| 2018/0137665 A1* | 5/2018 | Liu | G06T 11/60 |
| 2018/0157901 A1* | 6/2018 | Arbatman | G06K 9/00268 |
| 2018/0182141 A1* | 6/2018 | Caballero | G06T 11/00 |
| 2018/0277145 A1* | 9/2018 | Yamaya | G10L 15/02 |
| 2019/0065835 A1* | 2/2019 | Prokopenya | G06K 9/00214 |
| 2019/0122071 A1* | 4/2019 | Jin | G06K 9/00302 |
| 2019/0138096 A1 | 5/2019 | Lee et al. | |
| 2020/0086496 A1* | 3/2020 | Shin | G06K 9/00255 |
| 2020/0410217 A1* | 12/2020 | Sugimoto | G06F 3/012 |

FOREIGN PATENT DOCUMENTS

| | | |
|---|---|---|
| JP | 2002304638 | 10/2002 |
| JP | 2009153692 | 7/2009 |
| JP | 2018124666 | 8/2018 |
| TW | I596506 | 8/2017 |
| TW | 201822134 | 6/2018 |
| TW | I625680 | 6/2018 |
| TW | I668980 | 8/2019 |
| WO | 2018128996 | 7/2018 |

OTHER PUBLICATIONS

Muharram Mansoorizadeh, et al., "Hybrid Feature and Decision Level Fusion of Face and Speech Information for Bimodal Emotion Recognition." Proceedings of the 14th International CSI Computer Conference, Oct. 20, 2009, pp. 652-657.

"Search Report of Europe Counterpart Application", dated Dec. 21, 2020, p. 1-p. 6.

"Office Action of Japan Related Application, application No. 2019-221853", dated Jan. 19, 2021, p. 1-p. 5.

"Search Report of Europe Related Application, application No. 19209606.3", dated May 29, 2020, p. 1-p. 10.

* cited by examiner

# AVATAR FACIAL EXPRESSION GENERATING SYSTEM AND METHOD OF AVATAR FACIAL EXPRESSION GENERATION

CROSS-REFERENCE TO RELATED APPLICATION

This application is a continuation-in-part application of and claims the priority benefit of U.S. application Ser. No. 16/655,250, filed on Oct. 17, 2019, which is a continuation-in-part application of and claims the priority benefit of U.S. application Ser. No. 16/136,241, filed on Sep. 19, 2018. The entirety of each of the above-mentioned patent applications is hereby incorporated by reference herein and made a part of this specification.

BACKGROUND OF THE DISCLOSURE

1. Field of the Disclosure

The present disclosure generally relates to an avatar simulation, in particular, to an avatar facial expression generating system and a method of avatar facial expression generation.

2. Description of Related Art

Technologies for simulating senses, perception and/or environment, such as virtual reality (VR), augmented reality (AR), mixed reality (MR) and extended reality (XR), are popular nowadays. The aforementioned technologies can be applied in multiple fields, such as gaming, military training, healthcare, remote working, etc.

In order to let the user perceive the virtual environment as a real environment, the motion of the human body portions of the user or the facial expression of the user in the real environment would be tracked, so that the facial expression of an avatar presented on a VR, AR, MR or XR display can be changed in response to the motion or the facial expression of the user, and the social communication effect in the virtual environment may be improved.

Regarding facial expression simulation, in conventional approaches, a camera is disposed to capture the face of a user with a head-mounted display (HMD), and the simulated facial expression would be generated according to the facial features in the captured image. However, a part of the face is covered by the HMD, so that it is hard to identify facial features and facial expressions, and the facial expression of the avatar may not be the same as the facial expression of the user in the real environment.

SUMMARY OF THE DISCLOSURE

Accordingly, the present disclosure is directed to an avatar facial expression generating system and a method of avatar facial expression generation, to simulate avatar facial expression with emotion in a virtual environment.

In one of the exemplary embodiments, a method of avatar facial expression generation includes, but not limited to, the following steps. Multiple user data are obtained. Each user data is related to the sensing result of a user from multiple data sources. Multiple first emotion decisions are determined, respectively, based on each user data. Whether an emotion collision occurs among the first emotion decisions is determined. The emotion collision is related that the corresponding emotion groups of the first emotion decisions are not matched with each other. A second emotion decision is determined from one or more emotion groups according to the determining result of the emotion collision. The first or second emotion decision is related to one emotion group. A facial expression of an avatar is generated based on the second emotion decision.

In one of the exemplary embodiments, a facial expression generating system includes, but not limited to, one or more tracking devices, a memory, and a processor. The tracking device obtains multiple user data. Each user data is related to the sensing result of a user from one of multiple data sources. The memory stores a program code. The processor is coupled to the memory and load the program code to perform the following steps. The processor determines multiple first emotion decisions based on each user data respectively, determines whether an emotion collision occurs among the first emotion decisions, determines a second emotion decision from one or more emotion groups according to the determining result of the emotion collision, and generates a facial expression of an avatar based on the second emotion decision. The emotion collision is related that the corresponding emotion groups of the first emotion decisions are not matched with each other. The first or second emotion decision is related to one emotion group.

It should be understood, however, that this Summary may not contain all of the aspects and embodiments of the present disclosure, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
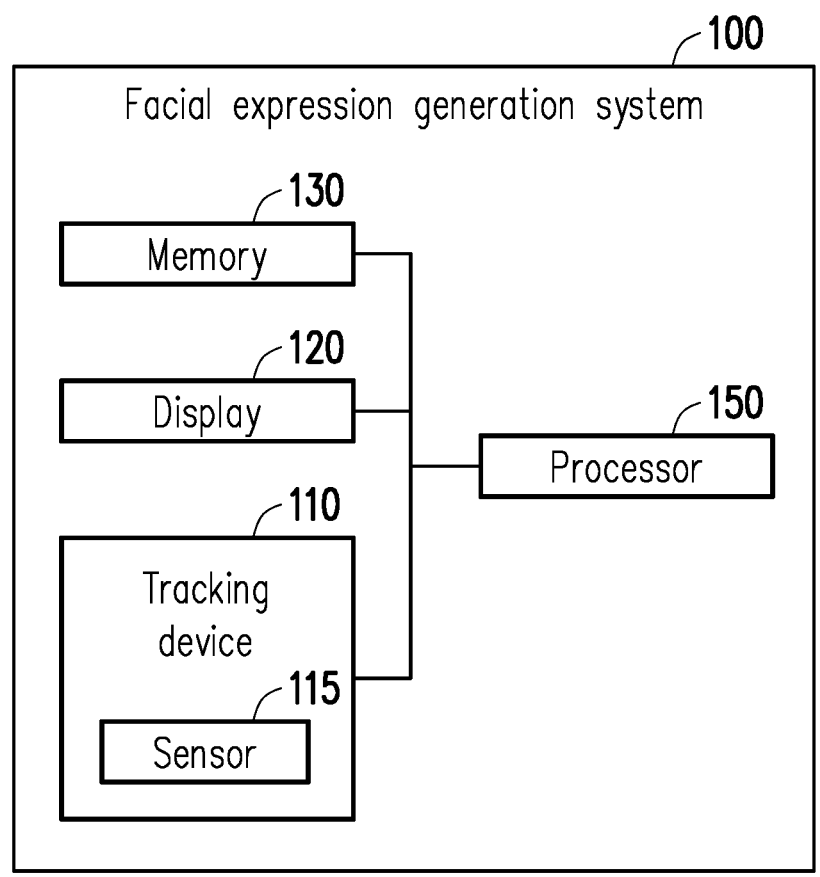
FIG. 1 is a block diagram illustrating an avatar facial expression generating system according to one of the exemplary embodiments of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a block diagram illustrating an avatar facial expression generating system according to one of the exemplary embodiments of the disclosure. Referring to FIG. 1, the avatar facial expression generating system 100 includes, but not limited to, one or more tracking devices 110, a display 120, a memory 130, and a processor 150. The avatar facial expression generating system 100 is adapted for VR, AR, MR, XR or other reality simulation related technology.

The tracking device 110 is a handheld controller, a wearable apparatus (such as a wearable controller, a smartwatch, an ankle sensor, a head-mounted display (HMD), or the likes), or a sensing device (such as a camera, an inertial measurement unit (IMU), a heart rate monitor, an infra-red (IR) transmitter/receiver, an ultrasonic sensor, a sound recorder, a strain gauge) used for obtaining user data. The user data is related to the sensing result of a user from one or more data sources. The tracking device 110 may include one or more sensors 115, to sense the corresponding target portion of the user and generate a sequence of sensing data from the sensing result (e.g. camera images, sensed strength values) at multiple time points within the time period. These data sources are different in target portions of the user or sensing technologies. For example, the target portion may be the human body portion (such as part or whole of the face, the hand(s), the head, the ankle(s), the leg(s), the waist(s)), the organ (such as the brain, the heart, the eye(s)), or the tissue (such as muscle(s), nervous tissue(s)) of the user. The sensing technology of the sensor 115 may be related to image, sound wave, ultrasonic, current, electric potential, IR, force, motion sensing data related to displacements and rotation of the human body portion, etc.

In one embodiment, the data source may be a facial muscle activity, a speech, an image of the partial or whole face, the motion of the arms, the legs, or the head, a heart electrical activity, or a brain electrical activity. In some embodiments, the data source may be real-time data detection from the sensor 115 or pre-configured data generated by the processor 150.

The display 120 may be a liquid-crystal display (LCD), a light-emitting diode (LED) display, an organic light-emitting diode (OLED) display, or other displays. In the embodiment of the disclosure, the display 120 is used for displaying images, for example, the virtual environment. It should be noted that, in some embodiments, the display 120 may be a display of an external apparatus (such as a smartphone, a tablet, or the likes), and the external apparatus can be placed on the main body of an HMD.

The memory 130 may be any type of a fixed or movable random-access memory (RAM), a read-only memory (ROM), a flash memory, a similar device or a combination of the above devices. The memory 130 records program codes, device configurations, buffer data or permanent data (such as user data, training data, emotion classifier, emotion decision, emotional configuration, weighted relation, linear relation, emotion groups), and these data would be introduced later.

The processor 150 is coupled to the tracking device 110, the display 120, and the memory 130. The processor 150 is configured to load the program codes stored in the memory 130, to perform a procedure of the exemplary embodiment of the disclosure.

In some embodiments, the processor 150 may be a central processing unit (CPU), a microprocessor, a microcontroller, a digital signal processing (DSP) chip, a field-programmable gate array (FPGA). The functions of the processor 150 may also be implemented by an independent electronic device or an integrated circuit (IC), and operations of the processor 150 may also be implemented by software.

It should be noticed that the processor 150 may not be disposed at the same apparatus with the tracking device 110 and the display 120. However, the apparatuses respectively equipped with the tracking device 110, the display 120, and the processor 150 may further include communication transceivers with compatible communication technology, such as Bluetooth, Wi-Fi, and IR wireless communications, or physical transmission line, to transmit or receive data with each other. For example, the display 120 and the processor 150 may be disposed in an HMD while the sensor 115 is disposed outside the HMD. For another example, the processor 150 may be disposed in a computing device while the tracking device 110 and the display 120 being disposed outside the computing device.

To better understand the operating process provided in one or more embodiments of the disclosure, several embodiments will be exemplified below to elaborate the operating process of the avatar facial expression generating system 100. The devices and modules in the avatar facial expression generating system 100 are applied in the following embodiments to explain the method of avatar facial expression generation provided herein. Each step of the method can be adjusted according to actual implementation situations and should not be limited to what is described herein.

Figure 2:
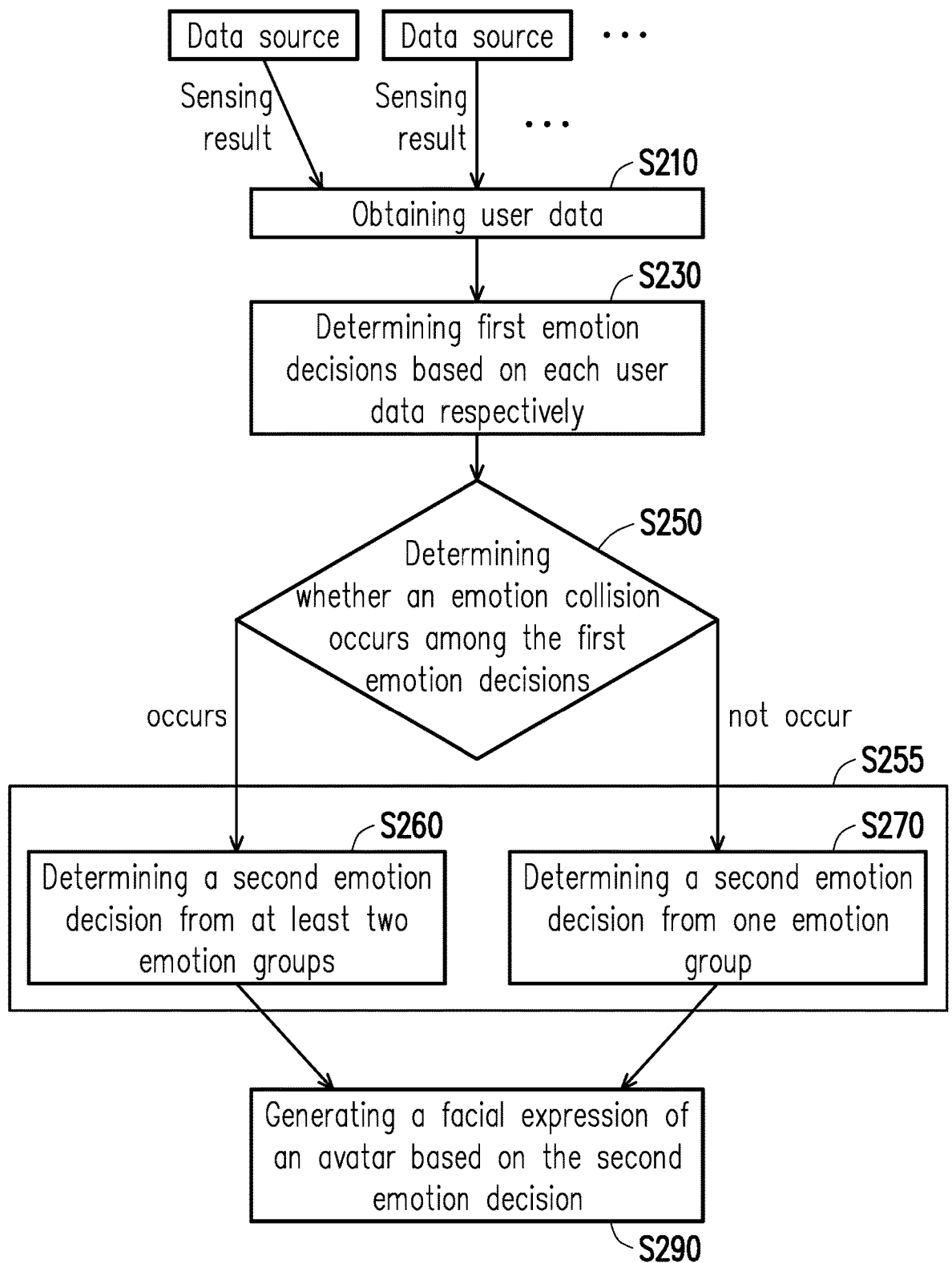
FIG. 2 is a flowchart illustrating a method of avatar facial expression generation according to one of the exemplary embodiments of the disclosure.
Figure 3:
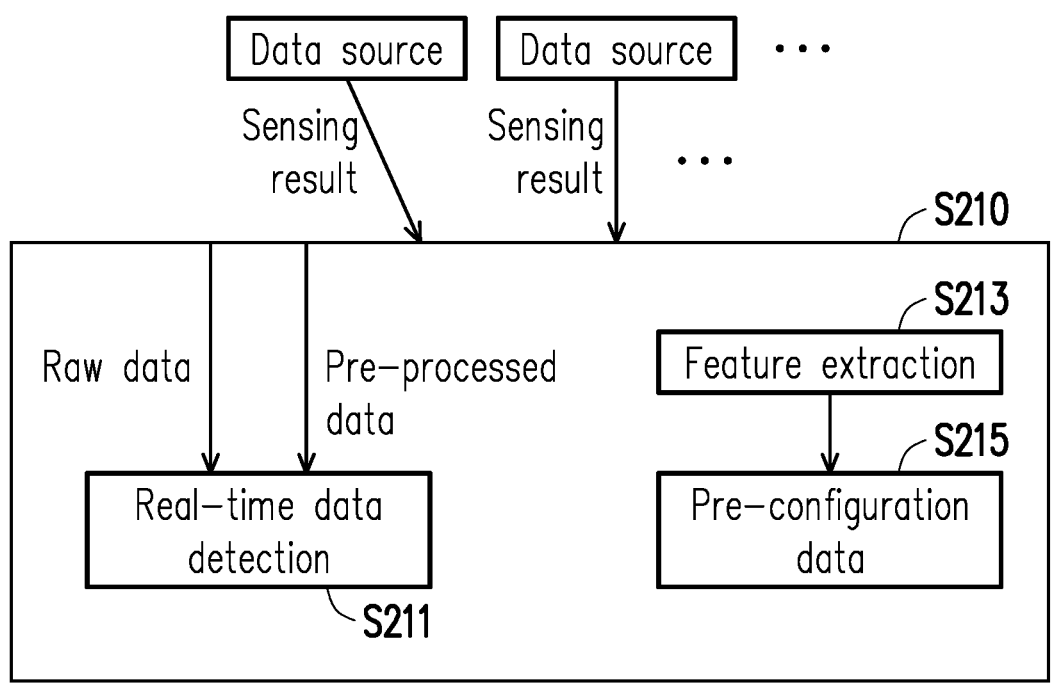
FIG. 3 is a flowchart illustrating user data generation according to one of the exemplary embodiments of the disclosure.

FIG. 2 is a flowchart illustrating a method of avatar facial expression generation according to one of the exemplary embodiments of the disclosure. Referring to FIG. 2, the processor 150 may obtain multiple user data through the tracking devices 110 (step S210). Specifically, these user data are obtained from multiple data sources. The processor 150 uses more data sources to improve the accuracy of the emotional estimation. FIG. 3 is a flowchart illustrating user data generation according to one of the exemplary embodiments of the disclosure. Referring to FIG. 3, in one embodiment, the processor 150 may obtain the sensing result such as raw data or pre-processed data (which may be processed by, for example, filter, amplification, analog-to-digital conversion) from each sensor 115 to generate the user data in real-time (i.e., the aforementioned real-time data detection) (step S211). For example, the user data could be the raw data collected from one or more images of the partial or whole face of the user, facial feature motion of the user (such as the motion of the eyebrow, eyes, nose, and mouth), and/or the speech of the user. In another embodiment, the processor 150 may perform the feature extraction (step S213) on each sensing result from each sensor 115 to generate the pre-configured data (step S215). The feature extraction is used to obtain derived values (features) intended to be informative and non-redundant from the sensing results, facilitating the subsequent analysis steps. For example, independent component analysis (ICA), Isomap, and Principal component analysis (PCA). The feature extraction may collect one or more specific motions/activities of a corresponding target portion of the user, one or more specific keywords or key phrases within a predefined time interval, or any feature defined in the machine learning technology (such as neural network (NN), K-means, support vector machine (SVM)). For example, the pre-configured data could be facial features of blinking or nodding within a predefined time interval or randomly generated facial features. For another example, the pre-configured data could be speech content or voice tone of the user. In some embodiments, the processor 150 may obtain the combination of the real-time data and the pre-configurated data.

Figure 4:
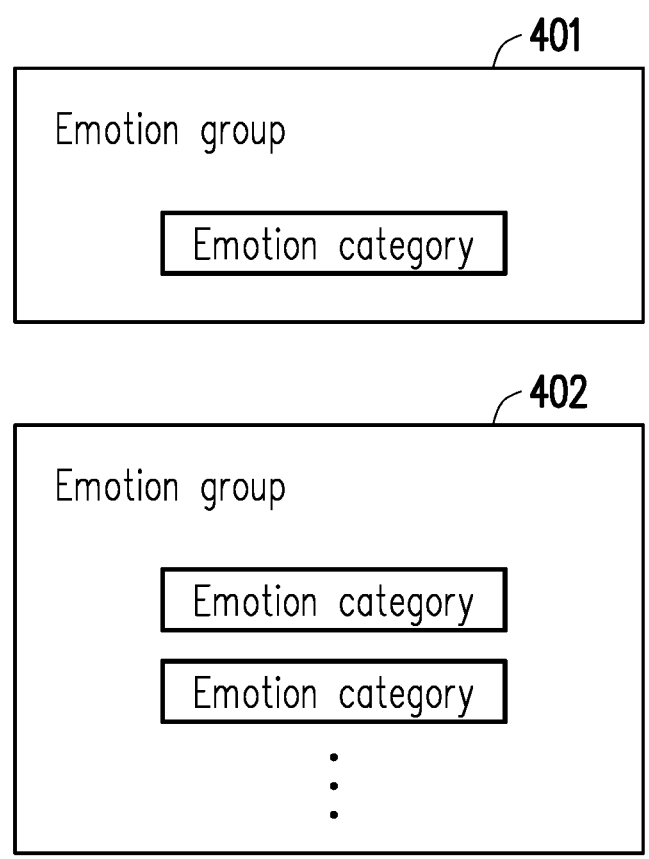
FIG. 4 is a schematic diagram illustrating types of the emotion group according to one of the exemplary embodiments of the disclosure.

The processor 150 may determine multiple first emotion decisions respectively based on each user data (step S230). Specifically, the processor 150 may predefine multiple emotion groups. FIG. 4 is a schematic diagram illustrating types of the emotion group according to one of the exemplary embodiments of the disclosure. Referring to FIG. 4, in one embodiment, as type 401, one emotion group includes merely one emotion category such as happiness, sadness, fear, disgust, anger, surprise, or excitement. In another embodiment, as type 402, one emotion group includes multiple emotion categories, and each category may be a positive or negative emotion. The positive emotion may include, for example, happiness, excitement, and surprise. The negative emotion may include, for example, sadness, fear, and anger. In some embodiments, some emotion groups may include merely one emotion category, and others may include multiple emotion categories.

Figure 5:
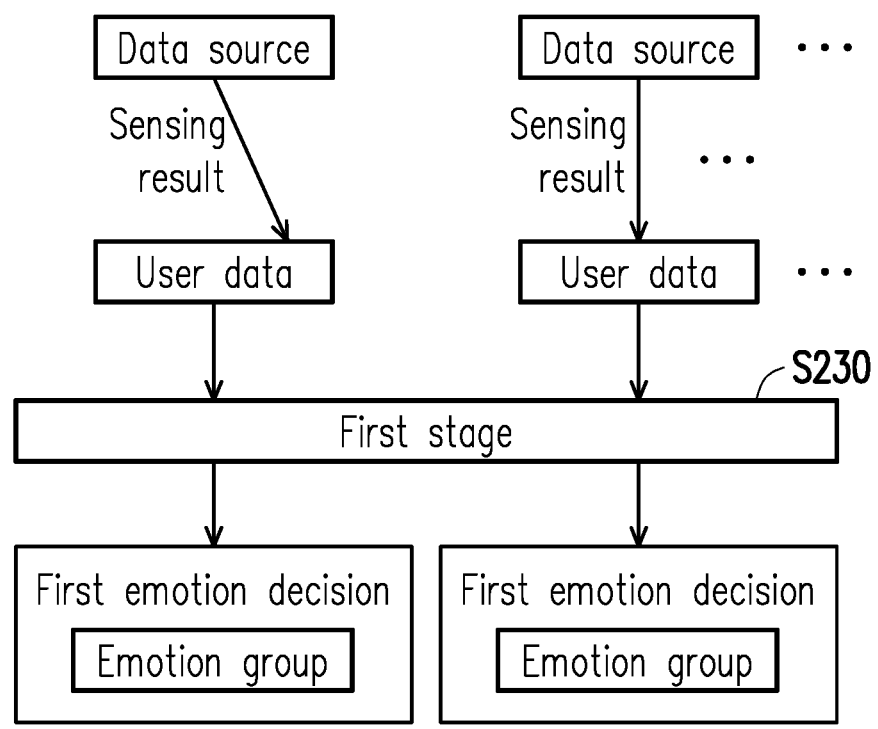
FIG. 5 is a schematic diagram illustrating the relationship of user data and the first emotion decision according to one of the exemplary embodiments of the disclosure.

It should be noted that each first emotion decision is related to (merely) one emotion group. FIG. 5 is a schematic diagram illustrating the relationship of user data and the first emotion decision according to one of the exemplary embodiments of the disclosure. Referring to FIG. 5, in the first stage which is step S230, the processor 150 may determine a corresponding emotion group for each user data from multiple data sources, respectively, to generate first emotion decisions from these user data. In one embodiment, each first emotion decision is a specific emotion. For example, the first data source is an image of the eyes of the user, and the second data source is a speech. The first emotion decisions are happiness and sadness motions for the first and second data sources, respectively. In another embodiment, each first emotion decision is an emotional weighted combination of two or more emotion categories. The emotional weights of the emotional weighted combination may be the format of percentage or strength degree (i.e., the level of the motion). For example, the third data source is a facial muscle activity. The first emotion decision is 60% of happiness emotion and 40% of surprise emotion for the third data source, in which the emotional weight of the happiness emotion is 0.6 and the emotional weight of the surprise emotion is 0.4. The emotional weight may be the ratio of the corresponding emotion category in all corresponding emotion categories. In some embodiments, each emotion may further include multiple levels. For example, the happiness emotion includes 3 levels, in which the first level represents the least strength degree and the third level represents the most strength degree of happiness emotion. Therefore, the emotional weight may be the strength degree of the corresponding emotion category. Therefore, the processor 150 may further determine the level of the emotion for each first emotion decision.

Figure 6:
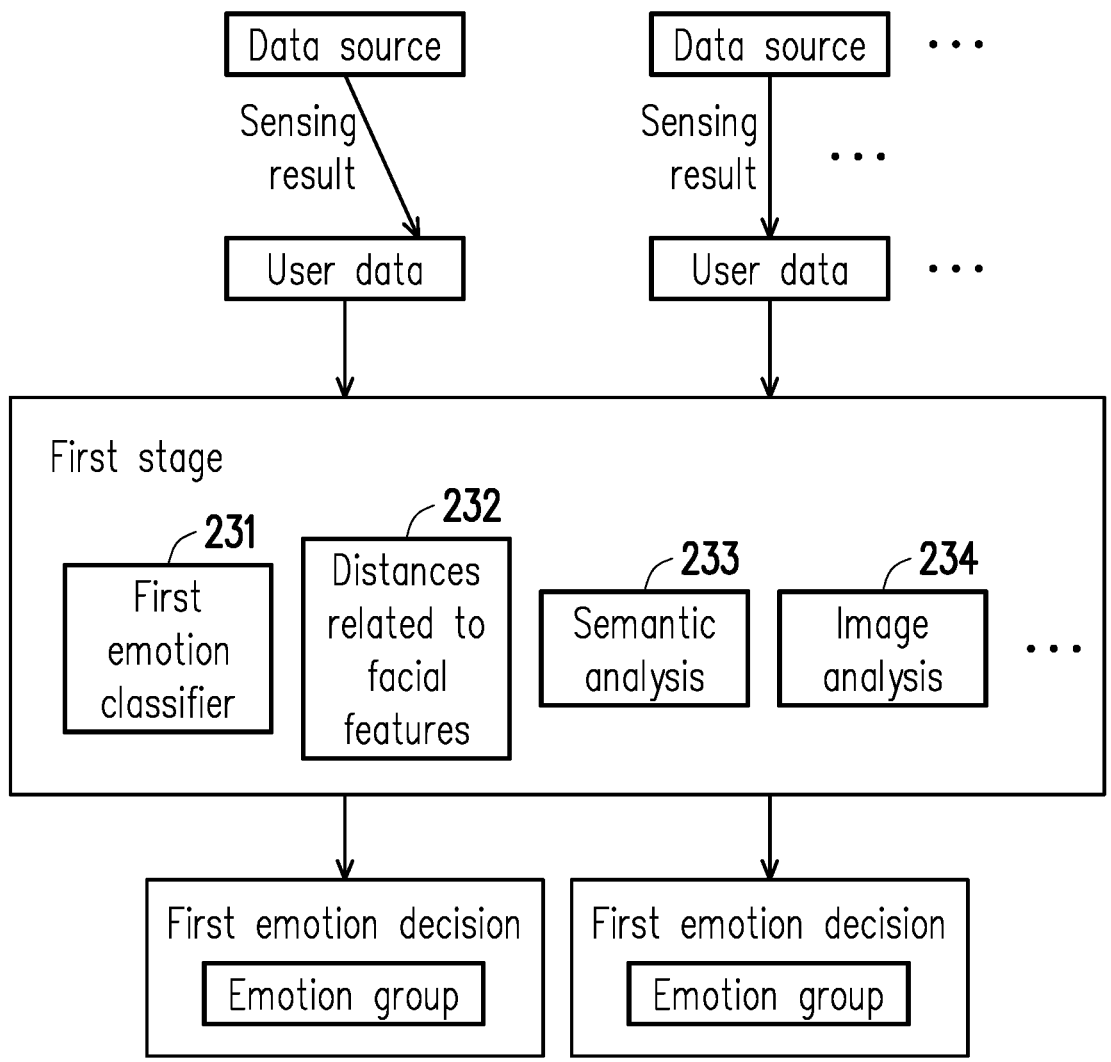
FIG. 6 is a schematic diagram illustrating the first stage according to one of the exemplary embodiments of the disclosure.

FIG. 6 is a schematic diagram illustrating the first stage according to one of the exemplary embodiments of the disclosure. Referring to FIG. 6, in one embodiment, the processor 150 may determine each first emotion decision, respectively, by using a first emotion classifier 231 based on a machine learning technology (NN, K-means, SVM, etc.) or the tree-based classification manner (boosted trees, bootstrap aggregating decision trees, etc.). In the machine learning technology, the classifier or the model is used to identify which of a set of categories an observation belongs. In this embodiment, the observation of the first emotion is user data, and the categories of the first emotion correspond to the second emotion decision. I.e., the first emotion classifier is used to identify which of the emotion groups each user data belongs. In other words, each user data could be the input data of the first emotion classifier, and each first emotion decision is the output data of the first emotion classifier. Taking artificial neural networks (ANN) as an example, ANNs are composed of artificial neurons that receive input data or the outputs of predecessor neurons. The network consists of connections, each connection providing the output of one neuron from the predecessor neurons and their connections as a weighted sum, in which each connection corresponds an input weight. In the learning stage of ANN, the input weight may be adjusted to improve the accuracy of the result of the classifier. It should be noted that in the learning stage, the processor 150 might train the first emotion classifier for each data source according to multiple first training emotions and training sensing data before. These first training emotions include all emotion groups. It means that the output data of the first emotion classifier may be anyone of the emotion groups. Furthermore, the training sensing data are obtained from each data source and corresponds to a specific emotion (which would become the first training emotion), respectively.

In another embodiment, the processor 150 may determine the first emotion decision according to one or more distances related to the facial features 232. For example, the existence of wrinkles on the nasion of the user, the shape of the eye, the existence of the teeth, the tongue or the nose. If the distance between the upper eyelids and the eyebrow is less than a threshold, the first emotion decision would be the happiness or surprise emotion. Furthermore, if the size of the mouth gape is larger than another threshold, the first emotion decision would be the surprise emotion.

In another embodiment, the processor 150 may identify words in the user data from a speech and perform a semantic analysis 233 on the identified word. During the semantic analysis, the processor 150 may determine whether the identified words in the user data are matched with a specific keyword or a specific key phrase, to determining whether the specific keyword or the specific key phrase is detected in the user data. The processor 150 may predefine multiple keywords and/or key phrases, and each predefined keyword or predefined key phrase is corresponding to a specific emotion, a specific level of one emotion, a specific emotional weighted combination of two or more emotion categories, or a specific emotional weighted combination of two or more emotions with specific levels. For example, user data is related to a sentence "I am very happy", and the keywords "very happy" is corresponding to the fifth level of happiness emotion. If the identified words are matched with one predefined keyword or one predefined key phrase (i.e., the predefined keyword or phrase is detected), the processor 150 determines that a corresponding first emotion decision is the fifth level of happiness emotion.

In another embodiment, the processor 150 may analyze the user data from the camera images or the motion sensing data. The processor 150 may perform image analysis 234 to determine whether a predefined motion or a predefined facial expression in the image is detected. For example, if the processor 150 detected that corners of the mouth in the camera image are raised, the processor 150 may consider a happiness emotion is detected. For another example, if the processor 150 detected that a user rises up his two hands in motion sensing data, the processor 150 may consider a happiness emotion is detected.

It should be noted that, depending on different data sources, there may be still lots of methods to determine the first emotion decision, and the embodiment is not limited thereto. Furthermore, in some embodiments, the processor 150 may select one or more data sources from all data sources to determine their corresponding first emotion decision. The selected data source may have more accurate decision on emotion estimation than the others.

After the first emotion decisions for multiple user data (or data sources) are determined, the processor 150 may determine whether an emotion collision occurs among the first emotion decisions (step S250). Specifically, the emotion collision is related that corresponding emotion groups of these first emotion decisions are not matched with each other. For example, if the first emotion decision for the fourth data source (such as the eye feature) is a positive emotion and the first emotion decision for the fifth data source (such as the mouth feature) is a negative emotion, the emotion collision would occur. For another example, if the first emotion decision for the sixth data source (such as electrocardiography (ECG)) is the happiness emotion and the first emotion decision for the seventh data source (such as electromyography (EMG)) is the sadness emotion, the emotion collision would occur.

In one embodiment, the processor 150 may use a reliable degree for the decision of the emotion collision. The reliable degree is how much the first emotion decision is reliable. Specifically, the processor 150 may determine the emotional values of these first emotion decisions respectively. The emotional value is related to how much the first emotion decision is reliable or how much the reliable degree is. The larger the emotional value is, the more reliable the first emotion decision is and the larger the reliable degree is. The less the emotional value is, the less reliable the first emotion decision is and the less the reliable degree is. The emotional value may be determined by the output of the first emotion classifier or another algorithm related to the confidence degree. Then, the processor 150 determines a weighted value combination of the emotional values and compares the weighted value combination of the emotional values with a reliable threshold. The processor 150 may give a corresponding emotional weight to the emotional value of each first emotion decision and perform the weight calculation on the emotional values with their corresponding emotional weights. If the emotional weighted combination is larger than the reliable threshold, the emotion collision does not occur. On the other hand, if the weighted value combination is not larger than the reliable threshold, the emotion collision occurs. It should be noted that, if the first emotion decision is an emotional weighted combination of multiple emotion categories, the emotional values may also be an emotional weighted combination of multiple emotion categories, and a corresponding reliable threshold would be equivalent or similar to a linear equation, an equation of a curve, or anther equation in a coordinate system at where the emotional values locate.

In some embodiments, the processor 150 may select one or more first emotion decisions with higher reliability to determine whether the emotion collision occurs. For example, processor 150 selects two first emotion decisions from facial muscle activity and the speech and compares whether the first emotion decisions belong to the same emotion group.

Then, the processor 150 may determine a second emotion decision from one or more the emotion groups according to the determined result of the emotion collision (step S255). The determined result may be the emotion collision occurs, and the emotion collision occurs may be the emotion collision does not occur. The processor 150 may fuse one or more emotion groups to generate the second emotion decision which is related to (merely) one emotion group.

In one embodiment, if the emotion collision occurs, the processor 150 may determine a second emotion decision from at least two emotion groups (step S260). Specifically, the first emotion decisions may include two or more emotion groups if the emotion collision occurs. In the second stage, the processor 150 may further determine second emotion decision from the emotion groups to which the first emotion decisions belong or from all emotion groups, and the second emotion decision is related to (merely) one emotion group.

Figure 7:
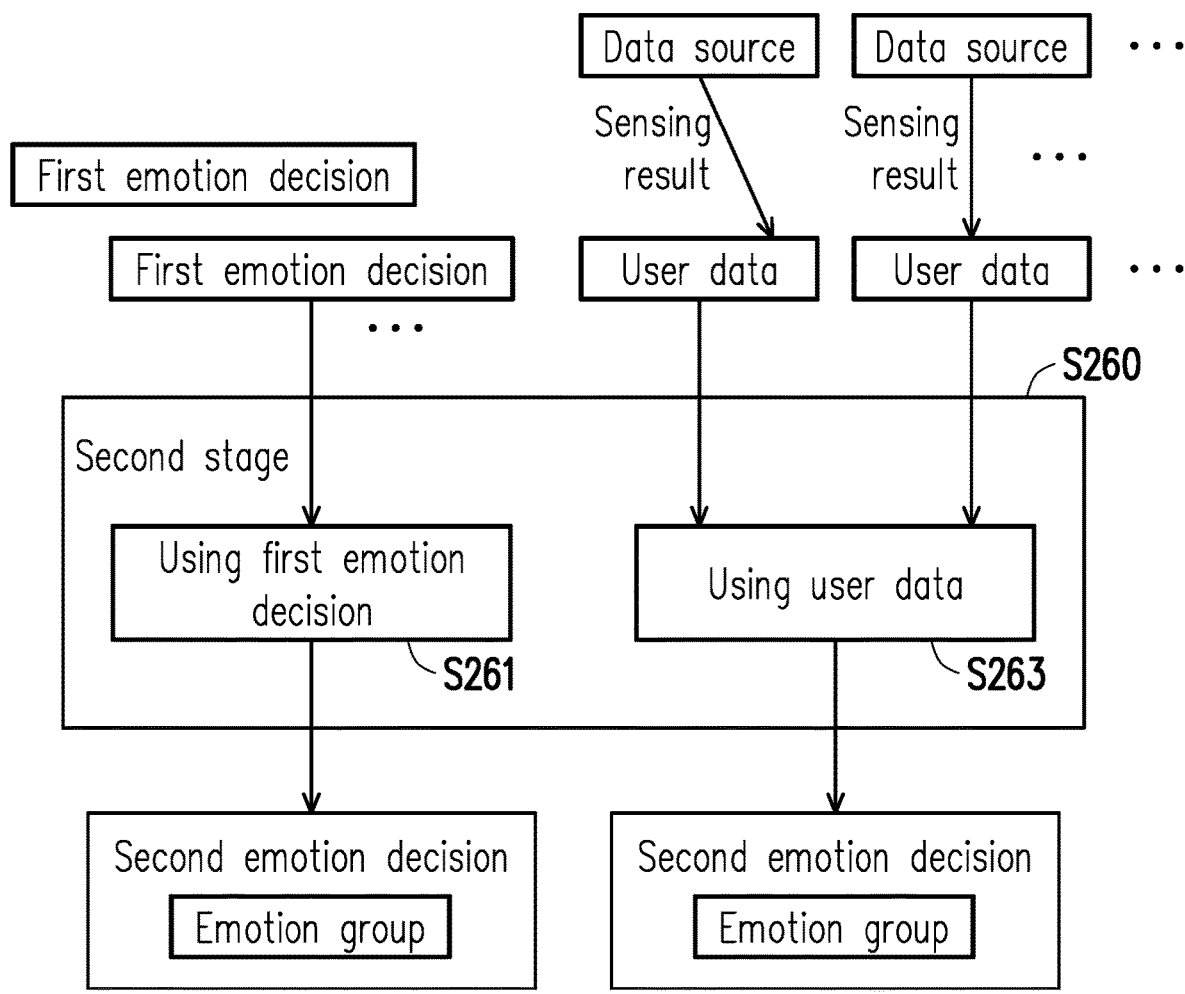
FIG. 7 is a flowchart illustrating the generation of the second emotion decision according to one of the exemplary embodiments of the disclosure.

FIG. 7 is a flowchart illustrating the generation of the second emotion decision according to one of the exemplary embodiments of the disclosure. Referring to FIG. 7, in one embodiment, the processor 150 may use one or more first emotion decisions to determine the second emotion decision (step S261). It means that the first emotion decisions would be the reference for the second emotion decision. In one embodiment, the processor 150 may determine a weighted decision combination of two or more first emotion decisions and determine the second emotion decision based on the weighted decision combination. The processor 150 may perform a weight calculation on the first emotion decisions, and the calculated result is related to the second emotion decision. The second emotion decision could be a real number, a specific emotion category, a specific level of a specific emotion category, or an emotional weighted combination of multiple emotion categories. In another embodiment, the second emotion decision would be determined through the machine learning technology or the tree-based classification manner, in which the first emotion decisions are the input data of the decision model.

It should be noted that in some embodiment, the processor 150 may select two or more first emotion decisions with higher reliability or different emotion groups to determine the second emotion decision.

In another embodiment, the processor 150 may use one or more user data from one or more data sources to determine the second emotion decision (step S263). It means that the user data would be the reference for the second emotion decision. In one embodiment, the processor 150 may determine the second emotion decision by using the second emotion classifier based on the machine learning technology or the tree-based classification manner. The second emotion classifier is used to identify which of the emotion groups these user data belong. The user data could be the input data of the second emotion classifier, and the second emotion decision is the output data of the second emotion classifier. It should be noted that the processor 150 might train the second emotion classifier according to multiple second training emotions and training sensing data before. These second training emotions include two or more emotion groups. It means that the output data of the second emotion classifier may be merely one of the selected emotion groups. Furthermore, the training sensing data are obtained from each data source and corresponds to a specific emotion (which would become the second training emotion), respectively. The processor 150 may select a second emotion classifier trained by the emotion groups of the first emotion decision or all emotion groups for the second emotion decision.

Figure 8:
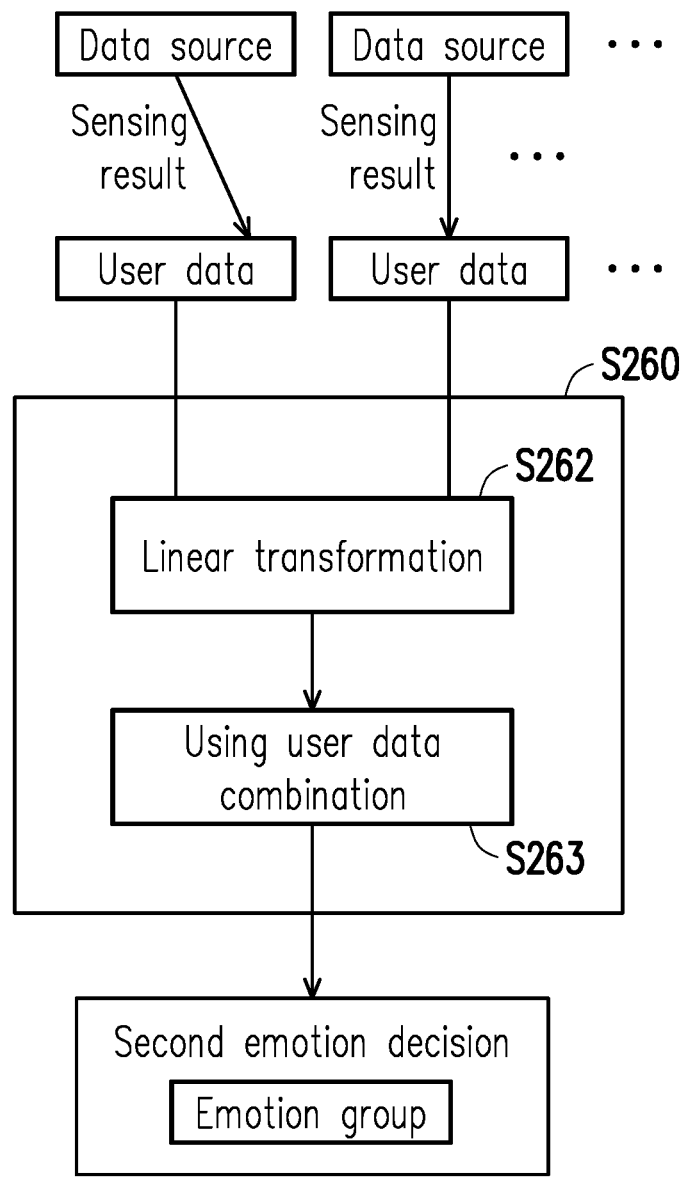
FIG. 8 is a flowchart illustrating the user data transformation according to one of the exemplary embodiments of the disclosure.

It should be noted that the raw data, the pre-processed data or the pre-configured data from multiple data sources may not have the same quantity, unit or collecting time interval. FIG. 8 is a flowchart illustrating the user data transformation according to one of the exemplary embodiments of the disclosure. Referring to FIG. 8, in one embodiment, the processor 150 may further combine two or more user data to be input to generate a user data combination. For example, after feature extraction, the user data from the first data source is a 40×1 matrix, the user data from the second data source is an 80×2 matrix, and the user data combination would be a 120×1 matrix. The processor 150 may further perform a linear transformation (step S262) on the user data combination extract facial features from the user data. The linear transformation is designed based on a specific machine learning technology or a specific tree-based classification manner. Then, the data after linear transformation would become the input of the second emotion classifier.

On the other hand, in one embodiment, if the emotion collision does not occur, the processor 150 may determine a second emotion decision from (merely) one emotion group (step S270). Specifically, the first emotion decisions may include merely one emotion group if the emotion collision does not occur. In one embodiment, one emotion group includes merely one emotion category, the processor 150 may determine any one of the first emotion decisions as the second emotion decision.

However, in some embodiments, one emotion group may include multiple emotion categories, and one emotion category may include multiple levels. The processor 150 may further determine the second emotion decision from the emotion categories to which the first emotion decisions belong, and the second emotion decision is related to (merely) a specific emotion category with a specific level or a specific emotional weighted combination of the emotion categories.

In one embodiment, the processor 150 may determine the second emotion decision by using a third emotion classifier based on the machine learning technology or the tree-based classification manner. The third emotion classifier is used to identify which of the emotion groups the user data or the first emotion decisions belong. The user data or one or more the first emotion decisions is the input data of the third emotion classifier, and the second emotion decision is the output data of the third emotion classifier. It should be noted that, compared with the first and second emotion classifiers, the processor 150 trains the third emotion classifier according to a third training emotion, and the third training emotion includes merely one emotion group. The processor 150 may select the third emotion classifier trained by the emotion group of the first emotion decisions for the second emotion decision. In another embodiment, the processor 150 may determine a weighted decision combination of two or more first emotion decisions and determine the second emotion decision based on the weighted decision combination.

Then, the processor 150 may generate a facial expression of the avatar based on the second emotion decision (step S290). Specifically, the face of an avatar may include multiple facial features (such as shapes or motions of face, eyes, nose, eyebrows). The facial expression of the avatar may include geometry parameters and texture parameters (referred to as facial expression parameters together). Each geometry parameter is used to indicate a 2D or 3D coordinate of vertex of the face of the avatar. In some embodiments, each texture parameter is used to indicate a position of the face at which a facial image of a corresponding second emotion decision (e.g., a specific emotion, a specific level of a specific emotion, or a specific emotional weighted combination of multiple emotion categories) is applied.

The processor 150 may generate, merge or replace the second emotion decision with the features of the facial expression, to generate the facial expression corresponding to a specific emotion. In one embodiment, the processor 150 may select one facial expression from a corresponding facial expression group according to a probability distribution (such as normal distribution, geometric distribution, Bernoulli distribution). Each expression group comprises multiple facial expressions. Each emotion or each level of one emotion is corresponding to a specific expression group. For example, there are 10 facial expressions for a specific second emotion decision, and the processor 150 may select one from the 10 facial expressions randomly.

In some embodiments, the processor 150 may generate facial features for each second emotion decision. Each second emotion decision may be configured with a specific limitation (such as length, angle, color, size) for parameters of the facial features, and a corresponding facial feature can be generated based on the limitation. For example, the length of the lip has a range when the second emotion decision has the happiness emotion and a emotional weight of the happiness emotion is more than 0.1.

In some embodiments, each second emotion decision is corresponding to a facial template, and the facial template is corresponding to a specific image or a specific animation. The processor 150 may paste the facial template at a specific position of the facial model.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method of avatar facial expression generation, comprising:

obtaining a plurality of user data from at least one sensor, wherein each of user data is related to sensing result of a user from one of a plurality of data sources;

determining, respectively, a plurality of first emotion decisions based on each of user data, wherein each of the first emotion decisions is related to one of a plurality of emotion groups;

determining whether an emotion collision occurs among the plurality of first emotion decisions, wherein the emotion collision is related that corresponding emotion groups of the plurality of first emotion decisions are not matched with each other, and determining whether the emotion collision occurs comprises:

determining, respectively, emotional values of the plurality of first emotion decisions;

determining a weighted calculation result of the emotional values by performing a weighted sum calculation on the emotional values with corresponding emotional weights, wherein each of the emotional values is related to how much a corresponding first emotion decision is reliable; and comparing the weighted calculation result of the emotional values with a reliable threshold, wherein the emotion collision does not occur in response to the weighted calculation result being larger than the reliable threshold, and the emotion collision occurs in response to the weighted calculation result being not larger than the reliable threshold;

determining a second emotion decision from at least one of the emotion groups of the plurality of first emotion decisions according to a determined result of the emotion collision, comprising:

determining the second emotion decision from the at least two of the emotion groups of the plurality of first emotion decisions based on at least one of the plurality of user data again without the plurality of first emotion decisions in response to the emotion collision occurring, wherein the second emotion decision is related to merely one of the plurality of emotion groups; and determining the second emotion decision from one of the emotion groups corresponding to all of the plurality of first emotion decisions in response to the emotion collision not occurring; and generating a facial expression of an avatar based on the second emotion decision.

2. The method of avatar facial expression generation according to claim 1, wherein the step of determining the second emotion decision from at least two of the emotion groups in response to the emotion collision occurring comprises:

using at least one of the first emotion decisions to determine the second emotion decision.

3. The method of avatar facial expression generation according to claim 2, wherein the step of using at least one of the first emotion decisions to determine the second emotion decision comprises:

determining a weighted decision combination of at least two of the first emotion decisions; and determining the second emotion decision based on the weighted decision combination.

4. The method of avatar facial expression generation according to claim 1, wherein the step of using at least one of the plurality of user data to determine the second emotion decision comprises:

combining at least two of the plurality of user data to generate a user data combination; and performing a linear transformation on the user data combination to extract facial features from the at least two of the plurality of user data.

5. The method of avatar facial expression generation according to claim 1, wherein the step of using at least one of the plurality of user data to determine the second emotion decision comprises:

determining the second emotion decision by using a first emotion classifier based on a machine learning technology, wherein the first emotion classifier is used to identify which of the emotion groups the at least one of the plurality of user data belongs, the at least one of the plurality of user data is an input data of the first emotion classifier, and the second emotion decision is an output data of the first emotion classifier, and the first emotion classifier s trained according to a plurality of first training emotions comprising at least two of the emotion groups.

6. The method of avatar facial expression generation according to claim 1, wherein the step of respectively determining the plurality of first emotion decisions based on each of user data comprises:

determining, respectively, each of first emotion decisions by using a second emotion classifier based on a machine learning technology, wherein the second emotion classifier is used to identify which of the emotion groups each of the plurality of user data belongs, the at least one of the plurality of user data is an input data of the second emotion classifier, each of first emotion decisions is an output data of the second emotion classifier, and the second emotion classifier is trained according to a plurality of second training emotions comprising all of the emotion groups.

7. The method of avatar facial expression generation according to claim 1, wherein each of the first emotion decisions or the second emotion decision is an emotional weighted combination of a plurality of emotion categories.

8. The method of avatar facial expression generation according to claim 1, wherein the step of determining the second emotion decision from one of the plurality of emotion groups comprises:

determining the second emotion decision by using a third emotion classifier based on a machine learning technology, wherein the third emotion classifier is used to identify which of the emotion groups the plurality of user data or the plurality of first emotion decisions belong, the at least one of the plurality of user data or at least one of the plurality of first emotion decisions is an input data of the third emotion classifier, the second emotion decision is an output data of the third emotion classifier, and the third emotion classifier is trained according to a third training emotion comprising merely one of the plurality of emotion groups.

9. The method of avatar facial expression generation according to claim 1, wherein the plurality of data sources are different in target portions of the user or sensing technologies.

10. An avatar facial expression generating system, comprising:

at least one tracking device, obtaining a plurality of user data from at least one sensor, wherein each of user data is related to sensing result of a user from one of a plurality of data sources;

a memory, storing a program code; and a processor, coupled to the memory, and loading the program code to perform:

determining, respectively, a plurality of first emotion decisions based on each of user data, wherein each of the first emotion decisions is related to one of a plurality of emotion groups;

determining whether an emotion collision occurs among the plurality of first emotion decisions, wherein the emotion collision is related that corresponding emotion groups of the plurality of first emotion decisions are not matched with each other, and determining whether the emotion collision occurs comprises:

determining, respectively, emotional values of the plurality of first emotion decisions;

determining a weighted calculation result of the emotional values by performing a weighted sum calculation on the emotional values with corresponding emotional weights, wherein each of the emotional values is related to how much a corresponding first emotion decision is reliable; and comparing the weighted calculation result of the emotional values with a reliable threshold, wherein the emotion collision does not occur in response to the weighted calculation result being larger than the reliable threshold, and the emotion collision occurs in response to the weighted calculation result being not larger than the reliable threshold;

determining a second emotion decision from at least one of the emotion groups of the plurality of first emotion decisions according to a determined result of the emotion collision, comprising:

determining the second emotion decision from the at least two of the emotion groups of the plurality of first emotion decisions based on at least one of the plurality of user data again without the plurality of first emotion decisions in response to the emotion collision occurring, wherein the second emotion decision is related to merely one of the plurality of emotion groups; and determining the second emotion decision from one of the emotion groups corresponding to all of the plurality of first emotion decisions in response to the emotion collision not occurring; and generating a facial expression of an avatar based on the second emotion decision.

11. The avatar facial expression generating system according to claim 10, wherein the processor further performs:

using at least one of the first emotion decisions to determine the second emotion decision.

12. The avatar facial expression generating system according to claim 11, wherein the processor further performs:

determining a weighted decision combination of at least two of the first emotion decisions; and determining the second emotion decision based on the weighted decision combination.

13. The avatar facial expression generating system according to claim 10, wherein the processor further performs:

combining at least two of the plurality of user data to generate a user data combination; and performing a linear transformation on the user data combination to extract facial features from the at least two of the plurality of user data.

14. The avatar facial expression generating system according to claim 10, wherein the processor further performs:

determining the second emotion decision by using a first emotion classifier based on a machine learning technology, wherein the first emotion classifier is used to identify which of the emotion groups the at least one of the plurality of user data belongs, the at least one of the plurality of user data is an input data of the first emotion classifier, and the second emotion decision is an output data of the first emotion classifier, and the first emotion classifier is trained according to a plurality of first training emotions comprising at least two of the emotion groups.

15. The avatar facial expression generating system according to claim 10, wherein the processor further performs:

determining, respectively, each of first emotion decisions by using a second emotion classifier based on a machine learning technology, wherein the second emotion classifier is used to identify which of the emotion groups each of the plurality of user data belongs, the at least one of the plurality of user data is an input data of the second emotion classifier, each of first emotion decisions is an output data of the second emotion classifier, and the second emotion classifier is trained according to a plurality of second training emotions comprising all of the emotion groups.

16. The avatar facial expression generating system according to claim 10, wherein each of the first emotion decisions or the second emotion decision is an emotional weighted combination of a plurality of emotion categories.

17. The avatar facial expression generating system according to claim 10, wherein the processor further performs:

determining the second emotion decision by using a third emotion classifier based on a machine learning technology, wherein the third emotion classifier is used to identify which of the emotion groups the plurality of user data or the plurality of first emotion decisions belong, the at least one of the plurality of user data or at least one of the plurality of first emotion decisions is an input data of the third emotion classifier, the second emotion decision is an output data of the third emotion classifier, and the third emotion classifier is trained according to a third training emotion comprising merely one of the plurality of emotion groups.

18. The avatar facial expression generating system according to claim 10, wherein the plurality of data sources are different in target portions of the user or sensing technologies.

* * * * *